United States Patent [19]

Hamasaki et al.

[11] Patent Number: 5,579,173
[45] Date of Patent: *Nov. 26, 1996

[54] FOCUS ADJUSTING APPARATUS OF ZOOM LENS

[75] Inventors: Takuji Hamasaki; Zenichi Okura, both of Tokyo, Japan

[73] Assignee: Asahi Kogaku Kogyo Kabushiki Kaisha, Tokyo, Japan

[*] Notice: The term of this patent shall not extend beyond the expiration date of Pat. No. 5,448,414.

[21] Appl. No.: 463,305

[22] Filed: Jun. 5, 1995

Related U.S. Application Data

[63] Continuation of Ser. No. 86,851, Jul. 7, 1993, Pat. No. 5,448,414.

[30] Foreign Application Priority Data

Jul. 13, 1992 [JP] Japan ................................. 4-048798

[51] Int. Cl.⁶ .................................................. G02B 15/14
[52] U.S. Cl. ........................... 359/700; 359/823; 359/694; 396/79; 396/83
[58] Field of Search .................................. 359/823, 694, 359/699, 700, 826; 354/195.1, 485, 195.12

[56] References Cited

U.S. PATENT DOCUMENTS

| | | | |
|---|---|---|---|
| 4,967,218 | 10/1990 | Nakano et al. | 354/195.1 |
| 5,012,273 | 4/1991 | Nakamura et al. | 354/485 |
| 5,051,764 | 9/1991 | Nomura | 354/195.1 |
| 5,144,493 | 9/1992 | Nomura | 359/700 |
| 5,144,494 | 9/1992 | Sekiguchi | 359/700 |
| 5,257,053 | 10/1993 | Kobayashi et al. | 354/195.1 |
| 5,327,184 | 7/1994 | Nomura et al. | 354/195.1 |
| 5,349,475 | 9/1994 | Nomura et al. | 359/700 |
| 5,448,414 | 9/1995 | Hamasaki et al. | 359/700 |

FOREIGN PATENT DOCUMENTS

| | | | |
|---|---|---|---|
| 2240132 | 7/1991 | United Kingdom | 359/826 |

*Primary Examiner*—Loha Ben
*Attorney, Agent, or Firm*—Greenblum & Bernstein P.L.C.

[57] ABSTRACT

A focus adjusting apparatus in a zoom lens in which a position of a zooming optical system in a zoom lens barrel is varied in an optical axis direction in accordance with an axial position of a rotatable cam ring. The apparatus includes a back focus adjusting mechanism for adjusting the axial position of the cam ring, an axially movable member which is movable together with the cam ring in the optical axis direction in accordance with the axial movement of the cam ring upon back focus adjustment, and a detecting mechanism provided between the axially movable member and the cam ring for detecting an angular position of the cam ring.

18 Claims, 2 Drawing Sheets

FOCUS ADJUSTING APPARATUS OF ZOOM LENS

This application is a continuation of application Ser. No. 08/086,851, filed Jul. 7, 1995 now U.S. Pat. No. 5,448,414.

BACKGROUND OF THE INVENTION

1. Field of the Invention

The present invention relates to an apparatus for adjusting a focal point of a zoom lens. More precisely, it relates to a focus adjusting apparatus having a detecting device which detects an angular position of a cam ring.

2. Description of Related Art

In a conventional zoom lens barrel, a code plate and a brush unit which come into electrical contact are provided between a cam ring, which is rotated to vary a focal length, and an immovable portion of the lens barrel to detect the focal length of the zoom lens.

Upon assembly of a zoom lens, it is necessary to adjust a back focal point (i.e., make a back focus adjustment) to make the focal point coincident with a film plane. The back focus adjustment is carried out by the movement of the entire lens system in the optical axis direction after the zoom adjustment is completed, so that no change of the focal point occurs during the zooming operation.

However, the back focus adjustment causes the position of the cam ring in the optical axis direction to change, thus resulting in a change in the relative position of the code plate and the brush unit in the optical axis direction. This problem can be solved by increasing the width of the conductive land on the code plate so as to compensate for the change in the relative position of the code plate and the brush unit caused by the back focus adjustment. However, this prevents a miniaturization of a compact camera.

SUMMARY OF THE INVENTION

It is an object of the present invention to provide an improved focus adjusting apparatus in which no change in the relative position of a code plate and a brush unit occurs during the back focus adjustment.

To achieve the object of the present invention, a focus adjusting apparatus of a zoom lens is provided, in which a position of a zooming optical system in a zoom lens barrel is varied in an optical axis direction in accordance with an axial position of a rotatable cam. The apparatus includes a back focus adjusting mechanism for adjusting the axial position of the cam ring, an axially movable member which is movable together with the cam ring in the optical axis direction in accordance with the axial movement of the cam ring upon back focus adjustment, and a detecting mechanism provided between the axially movable member and the cam ring for detecting an angular position of the cam ring. The detecting mechanism can include a code plate and a brush unit which comes into sliding contact with the code plate.

With this structure, for example, when the cam ring, having the code plate, is moved in the optical axis direction during the back focus adjustment, the axially movable member, having the brush unit, is also moved in the optical axis direction through the same displacement as the cam ring. Accordingly, there is no change in the relative position of the code plate and the brush unit in the optical axis direction. Consequently, it is not necessary to provide wide conductive lands or a wide conductor pattern on the code plate, unlike the prior art in which the width of the conductive lands must be large enough to compensate for the displacement of the code plate relative to the brush unit. This present invention allows for a reduction in the size of the zoom lens barrel, resulting in a realization of a small and compact camera.

Preferably, the axially movable member is a focus adjusting member which is provided, on the inner peripheral surface thereof, opposed to the cam ring, with a circumferential groove. The cam ring is provided on the outer peripheral surface thereof with a circumferential projection which can be slidably fitted in the circumferential groove of the focus adjusting member so as to prevent relative movement in the optical axis direction.

According to another aspect of the present invention, a focus adjusting apparatus of a zoom lens barrel is provided, including a rotatable cam ring, and a code plate having a predetermined conductor pattern provided on the cam ring, and extending in the circumferential direction of the cam ring. A brush unit having a plurality of brushes which intermittently come into sliding contact with the code plate to detect an angular position of the cam ring, and a member which is movable in the optical axis direction together with the cam ring, which is rotatable relative to the cam ring, and which supports the brush unit are provided. Finally, a restricting mechanism for restricting the axial movement of the axially movable member relative to the cam ring in the optical axis direction is provided.

With this structure, upon back focus adjustment, the cam ring can be moved in the optical axis direction together with the code plate and the brush unit. Conversely, upon completion of the back focus adjustment, the axially movable member is rotatable relative to the cam ring so as not to move in the optical axis direction. Consequently, there is no change in the relative position between the code plate and the brush unit, so that, upon designing the conductor pattern of the code plate, it is not necessary to take into account the displacement of the relative position which would otherwise be caused by the back focus adjustment.

The present disclosure relates to subject matter contained in Japanese Utility Model application No. HEI 4-48798 (filed on Jul. 13, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
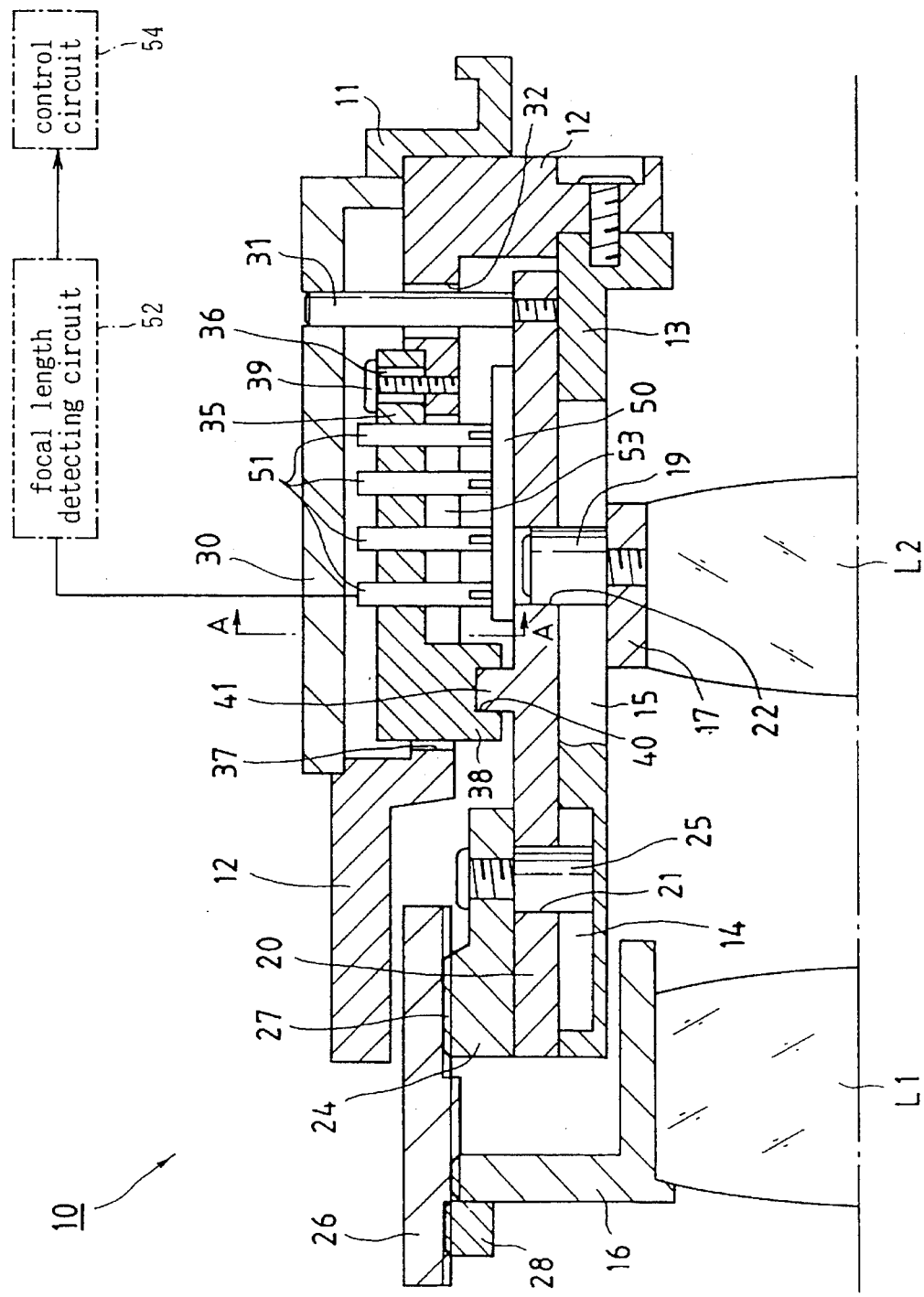
FIG. 1 is a sectional view of an upper half of a zoom lens barrel, according to the present invention.

The illustrated embodiment is applied to an interchangeable zoom lens barrel 10 of a single lens reflex camera.

A mount 11 is provided with an outer stationary cylinder 12 and a linear movement guide cylinder 13, both secured to the mount 11. The outer stationary barrel 12 and the linear movement guide cylinder 13 are immovable components of the interchangeable lens barrel 10.

Linear movement guide cylinder 13 is provided with linear movement guide grooves 14 and 15 aligned in the optical axis direction to guide front and rear lens assemblies L1 and L2, respectively. A rear lens frame 17, which holds the rear lens assembly L2, is provided with a cam roller 19 which projects outwardly in the radial direction and is fitted in the linear movement guide groove 15.

A cam or driving ring 20 is rotatably fitted on the outer periphery of linear movement guide cylinder 13. Cam ring 20 is provided with cam grooves 21 and 22 for guiding the front and rear lens assemblies. Cam roller 19 of rear lens frame 17, which is fitted in linear movement guide groove 15, is also fitted in cam groove 22. A front lens moving tube 24 is rotatably fitted onto the outer peripheral surface of the front end of cam ring 20, and is provided with a cam roller 25, integral therewith, which projects radially inward. Cam roller 25 is fitted in cam groove 21 of cam ring 20 and linear movement guide groove 14.

The outer peripheral surface of front lens moving tube 24 is screw-engaged with a focusing ring 26 through threaded portions 27, so that focusing ring 26 can be manually and externally actuated. Front lens frame 16 is secured to focusing ring 26 by a keep (or retainer) ring 28.

A zoom ring 30, which can be manually and externally actuated, is rotatably fitted on the outer periphery of outer stationary cylinder 12. Zoom ring 30 and cam ring 20 are connected to each other by a radially extending connecting pin 31, so that cam ring 20 rotates together with zoom ring 30. Connecting pin 31 extends through a circumferentially elongated hole 32 of outer stationary cylinder 12, whose length in the axial direction is long enough to permit connecting pin 31 to move in the optical axis direction by a predetermined displacement. Consequently, when zoom ring 30 is rotated, cam or driving ring 20 is rotated together therewith through connecting pin 31, so that rear lens frame 17 (and accordingly, rear lens assembly L2) and front lens moving tube 24 (and accordingly, focusing ring 26, front lens frame 16 and front lens assembly L1) are moved in accordance with cam grooves 21 and 22, and linear movement guide grooves 14 and 15 in the optical axis direction to carry out the zooming operation. On the other hand, when focusing ring 26 is rotated to effect the focusing operation, front lens frame 16 (i.e., front lens assembly L1) is moved in the optical axis direction through threaded portions 27.

In the interchangeable zoom lens barrel 10, as constructed above, when the position of cam ring 20 is adjusted in the optical axis direction, front lens assembly L1 and rear lens assembly L2 are moved together in the optical axis direction. Thus, back focus adjustment can be effected upon assembly by the adjustment of the axial position of cam ring 20.

Figure 2:
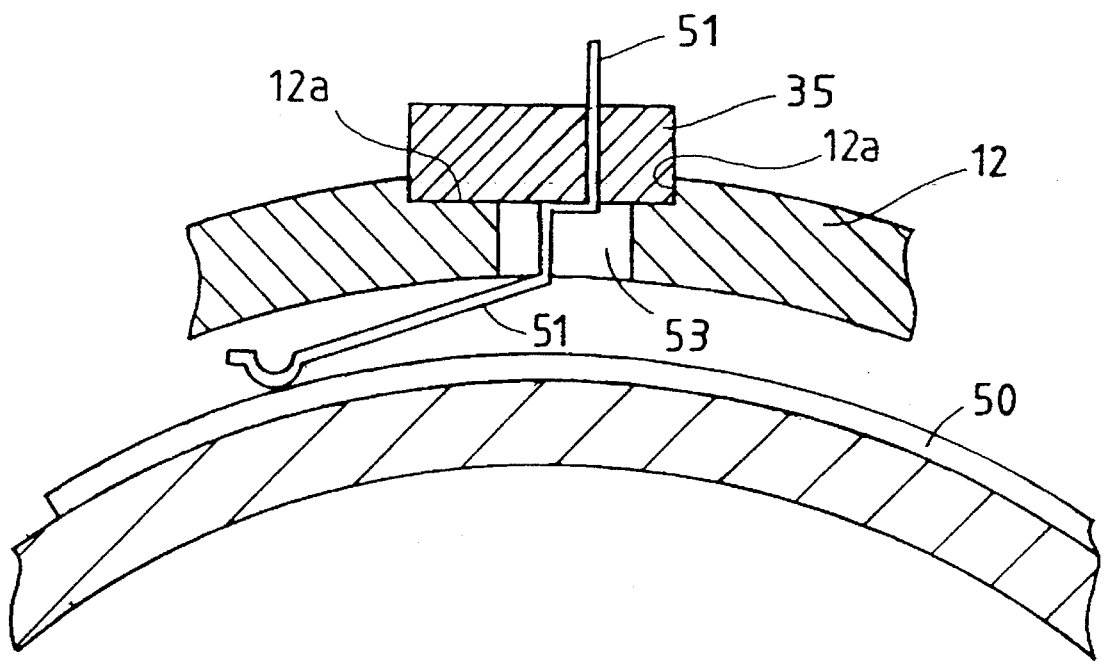
FIG. 2 is a sectional view along line A—A in FIG. 1.

In the illustrated embodiment, a focus adjusting member 35, which is movable in the optical axis direction, is provided to adjust the back focal point. The rear end of focus adjusting member 35 is slidably fitted in a recess 12a (FIG. 2) formed on outer stationary cylinder 12, so that the focus adjusting member 35 is capable of moving in a direction parallel with the optical axis on outer stationary cylinder 12. Focus adjusting member 35 is provided, on the outer peripheral rear surface thereof, with an elongated hole 36 extending in a direction parallel with the optical axis. A fastening screw 39, which is screwed through outer stationary cylinder 12, is inserted in elongated hole 36. Fastening screw 39 and elongated hole 36 constitute an adjusting and securing means of focus adjusting member 35. Namely, when fastening screw 39 is loosened, focus adjusting member 35 is movable in the optical axis direction to adjust the axial position thereof within an effective length of elongated hole 36. Conversely, when fastening screw 39 is fastened, focus adjusting member 35 does not to move relative to outer stationary cylinder 12 in the optical axis direction.

Focus adjusting member 35 is provided on the front end thereof with an inner flange 38 which projects into outer stationary cylinder 12 through a cut-away portion 37 of the latter. Cam ring 20 is provided with a radially protruding projection 41 extending in the circumferential direction. Inner flange 38 is provided with a circumferential groove 40 in which circumferential projection 41 of cam ring 20 is snugly fitted so as to rotate relative thereto.

A code plate 50 and a brush unit 51, having a plurality of brushes, are provided on the outer peripheral surface of cam or driving ring 20 and focus adjusting member 35, respectively, to detect the angular position of cam ring 20, i.e., the focal length during the zooming. The brushes of brush unit 51 extend through a hole 53 formed in outer stationary cylinder 12 towards code plate 50. The focus adjusting member 35, as illustrated in FIG. 1, includes circumferential groove 40 at a first end, elongated hole 36 at a second end, while the brush unit 51 is positioned between the circumferential groove and the elongated hole.

Figure 3:
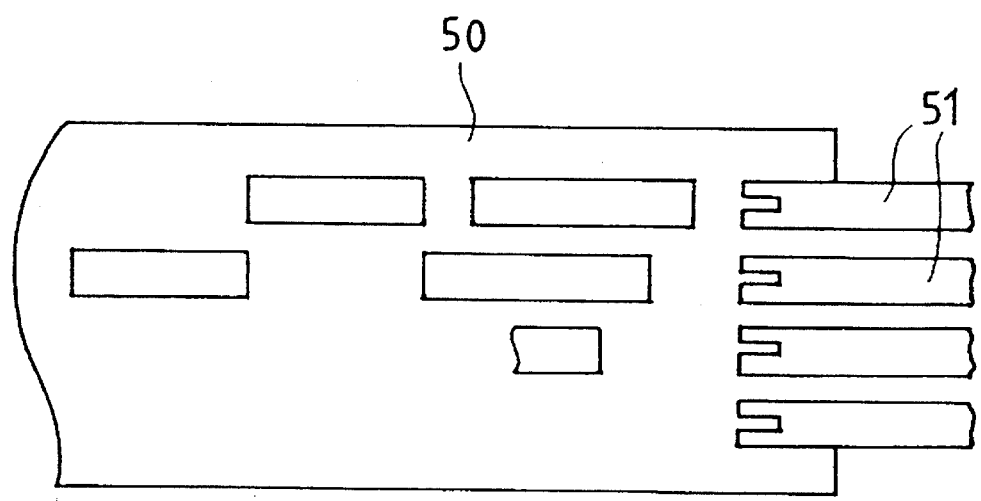
FIG. 3 is a developed view of a code plate and a brush unit shown in FIG. 1

Code plate 50 extends in the circumferential direction of cam ring 20 and has a predetermined conductor pattern (i.e., a plurality of bits of conductive lands and non-conductive portions), such that opposite ends of the conductive pattern extend substantially parallel to the optical axis, as shown in FIG. 3. The brushes of brush unit 51 intermittently come into electrical contact with the conductive lands of the conductor pattern, so that ON or OFF signals of the respective brushes are sent, for example, to a focal length detecting circuit 52 of a micro computer in the lens. Accordingly, the angular position of cam ring 20, i.e., the focal length of interchangeable zoom lens barrel 10, is determined.

The focal length thus detected is sent to a control circuit 54 in a camera body and is used to calculate an open F number and to indicate the focal length data, etc.

As can be seen from the above discussion, according to the present invention, upon adjustment, fastening screw 39 is loosened to move focus adjusting member 35 in the optical axis direction, so that the axial movement of cam ring 20 takes place in the same direction through circumferential groove 40 and circumferential projection 41. Since the axial movement of cam ring 20 causes the axial movement of the whole zoom lens system, the back focus adjustment can be carried out by the adjustment of the axial position of focus adjusting member 35.

Since there is no change in the relative position of cam ring 20 and focus adjusting member 35 during the back focus adjustment, the position of code plate 50 relative to brush unit 51 does not change. Consequently, it is not necessary for code plate 50 to have wide conductive lands to compensate for the back adjustment. Accordingly, the width of code plate 50 can be reduced. Upon completion of the adjustment, when zoom ring 30 is rotated to rotate cam or driving ring 20, circumferential projection 41 is moved in circumferential groove 40 of focus adjusting member 35. Accordingly, the zooming operation is not influenced by the adjustment.

The present invention is not limited to the illustrated embodiment discussed above. The present invention can be generically applied to a zoom lens barrel in which the axial position of the zooming optical system is varied in accordance with the axial position of the rotatable cam ring.

Although brush unit 51 is supported on focus adjusting member 35, it is possible to support brush unit 51 on any member which is linearly movable in the optical axis direction during the back focus adjustment. Namely, the above discussion has been directed to an embodiment in which a focus adjusting member 35 is provided as a back focus adjusting means, but the present invention is not limited thereto. The present invention can be applied to an optical system in which there is an additional back focus adjusting member or device other than focus adjusting member 35 which can be moved by the additional back focus adjusting member or device.

Although the illustrated embodiment is applied to an interchangeable zoom lens barrel 10 of a single lens reflex camera, the present invention can be generally applied to a camera having a zoom lens, including a compact camera or an electronic still camera, etc.

As can be understood from the foregoing, in a focus adjusting apparatus of a zoom lens barrel according to the present invention, when the cam ring is moved in the optical axis direction to effect the back focus adjustment, the relative position of the code plate and the brushes in the optical axis direction does not change. Consequently, it is not necessary to form wide conductive lands on the code plate, unlike the prior art in which the width of the conductive lands of the code plate must be large enough to absorb the possible displacement of the relative position between the code plate and the brush unit during the back focusing adjustment. Consequently, according to the present invention, the space necessary to incorporate the code plate is reduced, resulting in a miniaturization of a zoom lens or camera.

Although the invention has been described with reference to particular means, materials and embodiments, it is to be understood that the invention is not limited to the particulars disclosed and extends to all equivalents within the scope of the claims.

We claim:

1. A focus adjusting apparatus of a camera having a zoom lens, comprising:

a driving ring, fixedly positioned along an optical axis of the zoom lens and rotatable about the optical axis of the zoom lens during a zooming operation, said driving ring further being adjustably movable along the optical axis during an assembly operation, movement of said driving ring along the optical axis during the assembly operation axially moving an entire optical system of said zoom lens;

back focus adjustment means for adjusting an axial position of the driving ring during the assembly operation, to adjust a distance between the entire optical system and a film plane of the camera so that no change of focal point occurs during the zooming operation;

an axially movable member, said member movable together with said driving ring along the optical axis in accordance with axial movement of said driving ring during back focus adjustment by said back focus adjustment means, said axially movable member being fixed to a portion of a camera body and permitting said driving ring to rotate relative to said axially movable member when said driving ring is rotated to perform a zooming operation; and detecting means provided between said axially movable member and said driving ring, for detecting an angular position of said driving ring.

2. The focus adjusting apparatus of claim 1, wherein said detecting means comprises a code plate and a brush unit which comes into sliding contact with the code plate.

3. The focus adjusting apparatus of claim 2, wherein said code plate is provided on an outer peripheral surface of said driving ring and extends in a circumferential direction of said driving ring.

4. The focus adjusting apparatus of claim 3, wherein said brush unit is provided on the axially movable member and intermittently comes into contact with the code plate.

5. The focus adjusting apparatus of claim 4, wherein said axially movable member is a focus adjusting member which is provided with a circumferential groove on an inner peripheral surface, said circumferential groove being opposed to said driving ring.

6. The focus adjusting apparatus in claim 5, wherein said axially movable member constitutes said back focus adjustment means.

7. The focus adjusting apparatus of claim 5, wherein a circumferential projection, which can be slidably fitted in the circumferential groove of the focus adjusting member so as not to be movable along the optical axis with respect to said focus adjusting member, is provided on the outer peripheral surface of the driving ring.

8. The focus adjusting apparatus of a camera according to claim 2, said code plate comprising a predetermined conductor pattern, opposite ends of said conductor pattern extending substantially parallel to the optical axis.

9. The focus adjusting apparatus of claim 2, wherein, upon movement of said axially movable member, a distance between said code plate and brush unit remains constant.

10. The focus adjusting apparatus of claim 2, said axially movable member comprising a first end having a groove, a second end having a slot, said brush unit being positioned between said groove and said slot.

11. The focus adjusting apparatus of claim 1, wherein said zoom lens comprises a mount which can be detachably mounted to an associated camera, and an outer stationary cylinder which is secured to the mount.

12. The focus adjusting apparatus of claim 11, further comprising an adjusting and securing means for adjustably fixing the axially movable member to the outer stationary cylinder.

13. The focus adjusting apparatus of claim 12, wherein said axially movable member is a focus adjusting member which is provided on the front end thereof with an inner flange which projects into the outer stationary cylinder.

14. The focus adjusting apparatus of claim 13, wherein said outer stationary cylinder is provided with an opening through which the inner flange of the focus adjusting member extends.

15. The focus adjusting apparatus of claim 14, wherein said adjusting and securing means comprises an elongated hole formed in the outer peripheral surface of a rear end of the focus adjusting member and extending in a direction parallel with the optical axis, and a fastening screw which is inserted in the elongated hole and screwed into the outer stationary cylinder, so that when the fastening screw is loosened, the focus adjusting member can be moved in the optical axis direction within an effective length of the elongated hole to adjust the axial position of the focus adjusting member, wherein the focus adjusting member is fixed to the outer stationary cylinder when the fastening screw is fastened.

16. The focus adjusting apparatus of a camera according to claim 1, said back focus adjustment means comprising:
   means for defining a fixed position along the optical axis at which said driving ring is positioned during the assembly operation, for rotation at said fixed position during a zooming operation.

17. The focus adjusting apparatus of a camera according to claim 1, said detecting means comprising a pair of cooperating angular position detecting members for detecting an angular position of said driving ring, one of said cooperating pair of angular position detecting members being supported on said driving ring, and extending in a circumferential direction of said driving ring, the other of said pair of angular position detecting members being supported on said axially movable member.

18. The focus adjusting apparatus of claim 1, said axially movable member including a slot having a predetermined length, a screw extending into said slot, a length of said slot defining a range of movement of said axially movable member.

* * * * *

UNITED STATES PATENT AND TRADEMARK OFFICE
CERTIFICATE OF CORRECTION

PATENT NO. : 5,579,173
DATED : November 26, 1996
INVENTOR(S) : T. HAMASAKI et al.

It is certified that error appears in the above-indentified patent and that said Letters Patent is hereby corrected as shown below:

At column 6, line 18 (claim 6, line 1), change "in" to ---of---.

Signed and Sealed this

Thirteenth Day of May, 1997

*Attest:*

BRUCE LEHMAN

*Attesting Officer*  *Commissioner of Patents and Trademarks*